July 6, 1965  J. M. VANDEPOPULIERE  3,192,903
PROTECTIVE KEEL BONE COVERING FOR DOMESTIC FOWL
Filed March 7, 1963
FIG.1.
FIG.2.
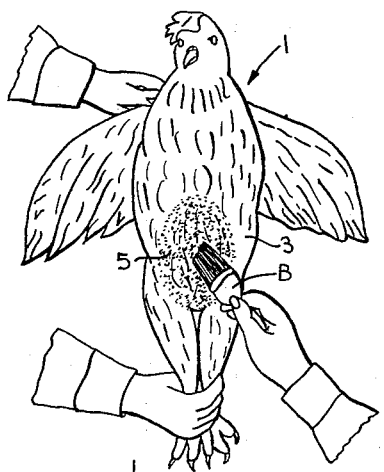
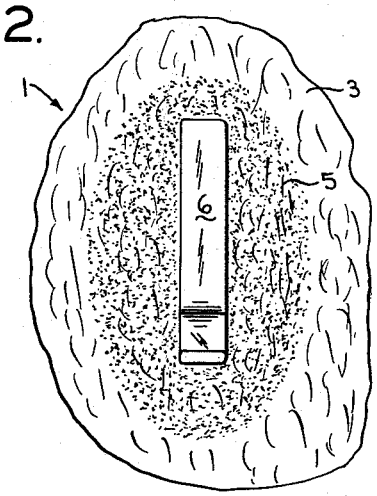
FIG.3.
FIG.4.
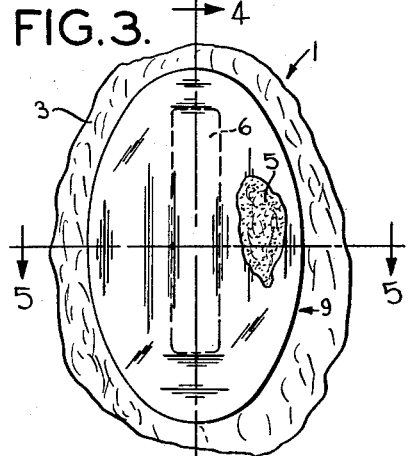
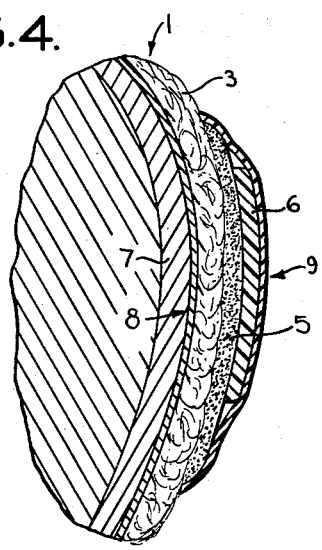
FIG.6.
FIG.5.
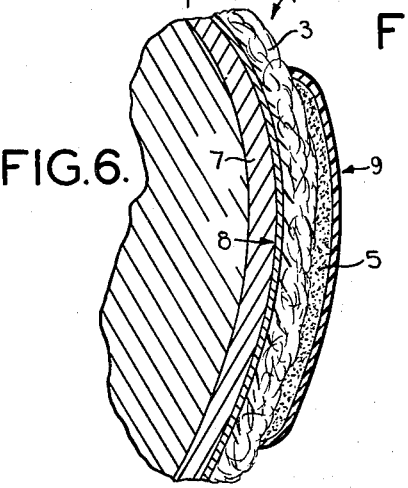
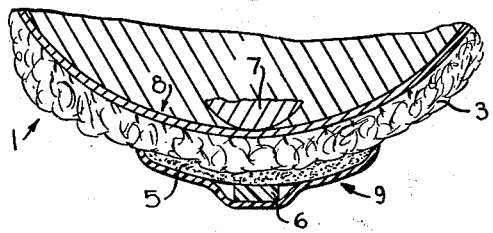
Joseph M. Vandepopuliere,
Inventor.
Koenig, Pope, Senniger and Powers,
Attorneys.

United States Patent Office 3,192,903
Patented July 6, 1965

3,192,903
PROTECTIVE KEEL BONE COVERING FOR DOMESTIC FOWL
Joseph M. Vandepopuliere, Ballwin, Mo., assignor to Ralston Purina Company, St. Louis, Mo., a corporation of Missouri
Filed Mar. 7, 1963, Ser. No. 263,496
3 Claims. (Cl. 119—143)

This invention relates to protective coverings for domestic fowl and more particularly to a protective covering for the keel bone area of domestic fowl to prevent skin blisters.

Briefly, my invention comprises a protective covering for the keel bone area of domestic fowl having a continuous protective layer adhered to the outer surface of the feathers of the feather covering and being spaced by the feather covering from the bare skin of the keel bone area whereby the feathers of the feather covering beneath the protective layer are held together and prevented from spreading while acting as a cushion between the protective layer and the skin of the keel bone area.

Among the several objects of this invention may be noted the provision of a protective covering for domestic fowl to protect the keel bone area of domestic fowl; the provision of such a protective covering which will remain in position on domestic fowl for a relatively long period of time even during the growth of the fowl and will be substantially unaffected by such growth; the provision of such a protective covering which will shield the keel bone area when the feathers are immature or absent in the keel bone area; and the provision of such a protective covering which is secured to the fowl in a minimum of time. Other objects and features will be in part apparent and in part pointed out hereinafter.

This invention accordingly comprises the constructions hereinafter described, the scope of the invention being indicated in the following claims.

The poultry industry has had difficulties in the part with the occurrence of breast blisters in the keel bone area, which results in the downgrading of the poultry and a decrease in the marketable value of the poultry. This has caused an economic loss and has created a problem in the poultry industry. Apparently an important cause of skin blisters in the keel bone area of domestic fowl is the rubbing and irritation of the skin from the fowl lying on the keel and if this area is protected, the incidence of breast blisters in domestic poultry is reduced or eliminated.

Heretofore, protective coverings have been applied in some instances as coatings to the bare skin in the keel bone area of domestic fowl and have been anchored or secured by the quills or shafts of the feathers surrounding the keel bone area. It has been found that during the growth of the breasts of the fowl, protective coatings on the bare skin of the fowl have a tendency to crack or peel away from the skin and fall free from the fowl. Other attempts to protect the keel bone area of the domestic fowl have involved protective fabric coverings over the keel bone area having straps which extend across the back of the fowl. Such straps are burdensome to the fowl and prevent the fowl from moving its wings unless the straps are placed under the wings which is confining and damaging to the fowl.

In the accompanying drawing, in which several of various possible embodiments of the invention are illustrated.

FIG. 1 is a front elevation showing an adhesive being applied to the outer surface of the feathers in the keel bone area of a fowl at the age of about six to nine weeks;

FIG. 2 is an enlarged fragment in plan showing a resilient pad being applied to the adhesive over the keel bone of the fowl of FIG. 1;

FIG. 3 is an enlarged fragment in plan showing the protective covering applied to the adhesive and extending over the pad of FIG. 2;

FIG. 4 is an enlarged section taken along line 4—4 of FIG. 3 and showing the several layers;

FIG. 5 is an enlarged section taken along line 5—5 of FIG. 3; and

FIG. 6 is a section of an embodiment in which the protective covering is applied directly to the adhesive without a resilient pad being employed.

Corresponding reference characters indicate corresponding parts throughout the drawing.

Referring to the drawing, I show in FIG. 1 a fowl designated generally 1 and being held for application of adhesive onto its natural feathering or feather covering 3 over the keel bone area. A brush B is employed to apply the adhesive onto fowl 1 for forming a continuous adhesive layer 5. The adhesive may, for example, be an acetate-acrylate co-polymer solution in toluene sold under the term "D-265 resin" by Shawinigan Resins Corporation, Springfield, Massachusetts. The continuous adhesive layer 5 is in a generally elliptical shape as shown in FIGS. 1–3 and is of a thickness preferably between about .001 inch and .005 inch. The adhesive does not penetrate the feathers but remains generally on the outer surface of the feathers.

To provide additional cushioning effect, a resilient pad 6 of synthetic foam in the form of a relatively narrow strip is placed on a central portion of adhesive layer 5 over the keel bone indicated at 7 and adheres to layer 5. Pad 6 is of a thickness preferably between about .125 inch and .250 inch and of a width between about .125 inch and .500 inch. A layer of skin is designated generally 8. A border of adhesive is left around pad 6 after the latter is secured to adhesive layer 5.

Next, the protective overlay or covering material generally designated 9 is placed on adhesive layer 5. Protective covering material 9 may be formed of plastic, rubber (latex emulsion) or natural materials having suitable adhesive properties and abrasive resistance. Natural materials which have been employed satisfactorily are wood shavings, sawdust, comminuted corn cobs, rock wool, and glass fiber. The natural materials have been employed in both a sheet form and in combination with the plastic materials in emulsions. Plastic materials which have been employed satisfactorily are polyvinyl alcohol, acetate, butyral, formal, and acrylate. The plastic materials may be applied in the form of a film or an emulsion. A preferred form of covering material is a plasticized polyvinyl alcohol resin film sold under the term "Gelvatol Film RS-4994" by Shawinigan Resins Corporation, Springfield, Massachusetts. A thickness between about .001 inch and .020 inch has been employed effectively for the plasticized polyvinyl alcohol resin film. The protective covering material 9 may be applied to the border of adhesive layer 5 and over pad 6 by hand if in the form of a film. In some instances when protective covering material 9 is in the form of an emulsion it may be sprayed on adhesive layer 5 over pad 6.

The age of the fowl when the protective covering is applied depends upon the time at which the fowl are marketed. If the fowl or birds are to be marketed at nine to ten weeks of age, the protective covering should be applied at approximately six weeks of age. If marketing is to be at thirteen weeks of age, then the protective covering material should be applied at approximately nine weeks of age.

If desired, the pad 6 may be omitted as indicated in the embodiment shown in FIG. 6. In this event the protective covering material 9 is applied directly to adhesive layer 5 immediately over the keel bone 7. As shown in FIG. 3, the protective overlay or covering material 9 may have a continuously curved edge so that there are no sharp corners to gouge the fowl or become snagged on the ground.

In a controlled test conducted at St. Louis, Missouri, the following results were obtained by the protective covering employing D-265 as an adhesive and plasticized polyvinyl alcohol resin film as a protective covering material secured to the adhesive. 528 cockerels of the age of 9 weeks were divided into a treated group of 262 birds and an untreated group of 262 birds. The adhesive was applied to the natural feathering and the protective covering material was secured to the adhesive without a resilient pad employed. At the age of 14 weeks 175 of the treated birds (those having a protective covering) were free of skin blister, while 89 birds had skin blister. The untreated birds grew under the same conditions but at the age of 14 weeks 116 birds had skin blister while 148 birds were free of blister. Thus, the incidence of breast blister was reduced from 41% to 34% by the use of protective coverings of the present invention.

The protective covering has little effect on the growth of the feathers when applied on the natural feathering, and as long as the feathers are not pulled from the keel bone area, the covering will remain in position. As the feathers grow, the protective covering will become somewhat loose, but it will continue to protect the keel bone area from breast blisters as long as it remains on the feathers, without any tendency to crack or peel away.

The positioning of the protective covering on the natural feathering of the fowl permits the fowl to grow without any substantial disturbance of the protective covering so that the protective covering remains on the fowl for a considerable length of time without any cracking or peeling off of the protective covering. Since the protective covering is applied over the natural feathering, the natural feathering is utilized as a cushion by the protective covering and the covering holds the feathers together over the keel bone area.

It is to be understood that certain types of plastics such as, for example, polyvinyl acetate resins, may be applied directly to the outer feathers of the fowl without an inner layer of adhesive. Thicknesses between .001 inch and .030 inch for such coverings would be effective.

In view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. A protective covering for protecting the skin and feather covering in the keel bone area of domestic fowl against blister comprising a continuous layer of adhesive adapted to be secured to the exposed outer surface of the feather covering in the keel bone area and spaced by the feather covering from said skin, a resilient pad overlying and secured to the continuous layer of adhesive in a central portion of the latter so as to leave a border of adhesive around said pad, and a continuous protective overlay over the pad and secured to the border of the adhesive, said protective overlay, when said protective covering is secured to a domestic fowl, being spaced by the pad and the feather covering from the skin of the keel bone area, whereby the feathers of the feather covering beneath the protective overlay are held together by the adhesive and prevented from spreading while acting as a cushion between the protective overlay and the skin of the keel bone area.

2. A protective covering for protecting the skin and feather covering in the keel bone area of domestic fowl against blister, comprising a continuous layer of adhesive adapted to be secured to the exposed outer surface of the feather covering in the keel bone area and spaced by the feather covering from said skin, and a continuous protective overlay over the adhesive and secured thereto, said protective overlay, when said protective covering is secured to a domestic fowl, being spaced by the feather covering and layer of adhesive from the skin of the keel bone area, whereby the feathers of the feather covering beneath the protective overlay are held together by the adhesive and prevented from spreading while acting as a cushion between the protective overlay and the skin of the keel bone area.

3. A protective covering as set forth in claim 2 wherein said protective overlay has a continuously curved edge.

References Cited by the Examiner

UNITED STATES PATENTS

| | | | |
|---|---|---|---|
| 693,514 | 2/02 | Haberstroh | 128—149 |
| 2,377,774 | 6/45 | Gotham | 17—1 |
| 2,688,311 | 9/54 | Pierce | 119—156 |
| 2,826,169 | 3/58 | Le Veen | 119—1 |
| 3,083,688 | 4/63 | Tillotson | 119—143 |
| 3,143,099 | 8/64 | Poole et al. | 119—143 |

SAMUEL KOREN, *Primary Examiner.*

ALDRICH F. MEDBERY, *Examiner.*